(12) United States Patent
Wang et al.

(10) Patent No.: US 7,445,351 B2
(45) Date of Patent: Nov. 4, 2008

(54) STORAGE MEDIUM PLAYER WITH INDICATOR LIGHT SHIELD

(75) Inventors: He-Li Wang, Guangdong (CN);
Xiang-Hui Zhang, Guangdong (CN);
Wen-Jie Bao, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 110 days.

(21) Appl. No.: 11/306,961

(22) Filed: Jan. 17, 2006

(65) Prior Publication Data

US 2007/0008648 A1   Jan. 11, 2007

(30) Foreign Application Priority Data

Jul. 8, 2005   (CN) .................... 2005 2 0061406 U

(51) Int. Cl.
*G06F 1/16* (2006.01)
(52) U.S. Cl. .................... 362/87; 362/187; 361/685
(58) Field of Classification Search ............ 361/685; 362/494, 184
See application file for complete search history.

(56) References Cited

U.S. PATENT DOCUMENTS

| 4,106,082 | A | 8/1978 | Laeng et al. |
| 4,167,774 | A | 9/1979 | Knuchel et al. |
| 6,796,674 | B2 * | 9/2004 | Galli ......................... 362/184 |
| 6,805,474 | B2 * | 10/2004 | Walser et al. ............... 362/494 |
| 6,891,721 | B2 * | 5/2005 | Huang ........................ 361/685 |
| 2002/0186638 | A1 | 12/2002 | Diaz et al. |
| 2003/0043590 | A1 * | 3/2003 | Walser et al. ............... 362/494 |
| 2004/0190192 | A1 | 9/2004 | Huang |

* cited by examiner

*Primary Examiner*—Anabel M Ton
(74) *Attorney, Agent, or Firm*—Winston Hsu

(57) ABSTRACT

A storage medium player includes a base, a printed circuit board mounted in the base, and an indicator device. The base includes an upper body and a lower body. One of the upper body and the lower body includes a first engaging portion and defines a hole. The indicator device includes an indicating lamp and a shield arranged between the indicating lamp and the hole. The indicating lamp is electrically connected with the printed circuit board so as to be supplied with an operating voltage by the printed circuit board. The shield is mounted in the base with one end thereof being engaged with the first engaging portion. The shield includes a main body and a protruding portion extending away from the main body. At least a part of the protruding portion is received in the hole.

20 Claims, 4 Drawing Sheets

STORAGE MEDIUM PLAYER WITH INDICATOR LIGHT SHIELD

FIELD OF THE INVENTION

This invention relates to storage medium players and, more particularly, to a storage medium player having a light shield secured thereon.

DESCRIPTION OF RELATED ART

Over the past several decades, storage medium players, such as digital versatile disc (DVD) players, video compact disc (VCD) players, and compact disc (CD) players, have become widely used. A general storage medium player includes a base, and a main unit mounted in the base. The main unit includes a driving device, a pick-up unit, and a printed circuit board (PCB). Both the driving device and the pick-up unit are electrically connected to the PCB.

In operation, the PCB sends a driving signal to both the driving device and the pick-up unit. The driving device drives a medium to rotate at a high velocity according to the driving signal. The pick-up unit reads the information recorded on the medium and then transmits the information to the PCB. The PCB processes the information so that the information can be reproduced.

An indicator device is utilized to indicate working states of the storage medium player. A typical indicator device includes an indicating lamp such as a light emitting diode (LED). The indicator device is electrically connected to the PCB. The PCB provides voltage to the indicating lamp, which then emits a light in a predetermined color at a specific luminance level. The base defines a hole corresponding to the indicating lamp so that the light emitted by the indicating lamp can be seen from outside the storage medium player.

In order to prevent the indicating lamp from being damaged, a shield is employed. The shield is made of transparent or translucent material so that the light emitted by the lamp can be easily viewed.

In general, the shield is fixed to the base via engagement of hooks and holes. The shield defines a plurality of fixing holes. The base forms a plurality of hooks extending perpendicularly from a sidewall thereof corresponding to the fixing holes. The hooks are inserted into the fixing holes to fix the shield firmly to the sidewall of the base.

However, the above-mentioned engagement method has some deficiencies. The size of the fixing holes must be precisely molded so as to firmly fix the shield. The shield is liable to become disengaged from the sidewall and fall away if the fixing holes are too large. On the other hand, the fixing holes are liable to be damaged if the fixing holes are too small. It is difficult to satisfy such dimensional precision.

Therefore, a heretofore unaddressed need exists in the industry to address the aforementioned deficiencies and inadequacies.

SUMMARY OF INVENTION

A storage medium player includes a base, a printed circuit board mounted in the base, and an indicator device. The base includes an upper body and a lower body. One of the upper body and the lower body includes a first engaging portion and defines a hole. The indicator device includes an indicating lamp and a shield arranged between the indicating lamp and the hole. The indicating lamp is electrically connected to the printed circuit board to be supplied with an operating voltage by the printed circuit board. The shield is mounted in the base with one end thereof being engaged with the first engaging portion. The shield includes a main body and a protruding portion extending away from the main body. At least one part of the protruding portion is received in the hole.

A storage medium player includes a base, a printed circuit board mounted in the base, and an indicator device. The base includes an upper body and a lower body. The upper body includes a first engaging portion. The lower body includes a second engaging portion. One of the upper body and the lower body defines a hole. The indicator device includes an indicating lamp and a shield. The indicating lamp is electrically connected with the printed circuit board to be supplied with an operating voltage by the printed circuit board. Opposite ends of the shield are engaged respectively with the first engaging portion and the second engaging portion. The shield is arranged between the indicating lamp and the hole.

Other advantages and novel features will become more apparent from the following detailed description of preferred embodiments when taken in conjunction with the accompanying drawings, in which:

DETAILED DESCRIPTION

Figure 1:
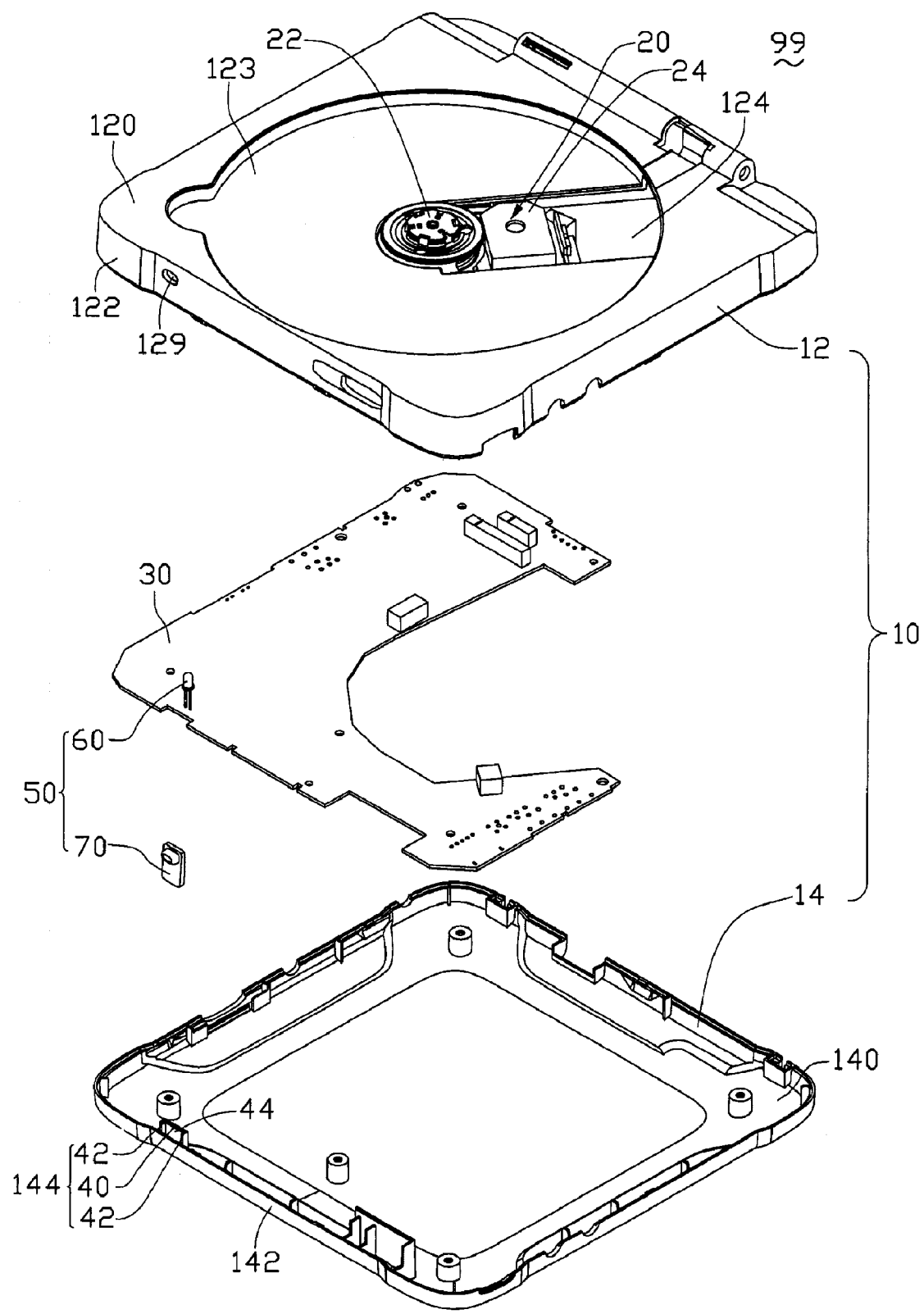
FIG. 1 is an exploded, isometric view of a storage medium player in accordance with the preferred embodiment of the present invention, with the storage medium player not having a lid.

Referring to FIG. 1, a storage medium player 99 in accordance with the preferred embodiment of the present invention includes a base 10, a traverse module 20, a printed circuit board (PCB) 30, and an indicator device 50. Both the traverse module 20 and the PCB 30 are mounted in the base 10.

The traverse module 20 includes a driving device 22 and a pick-up unit 24. Both the driving device 22 and the pick-up unit 24 are electrically connected with the PCB 30.

Figure 2:
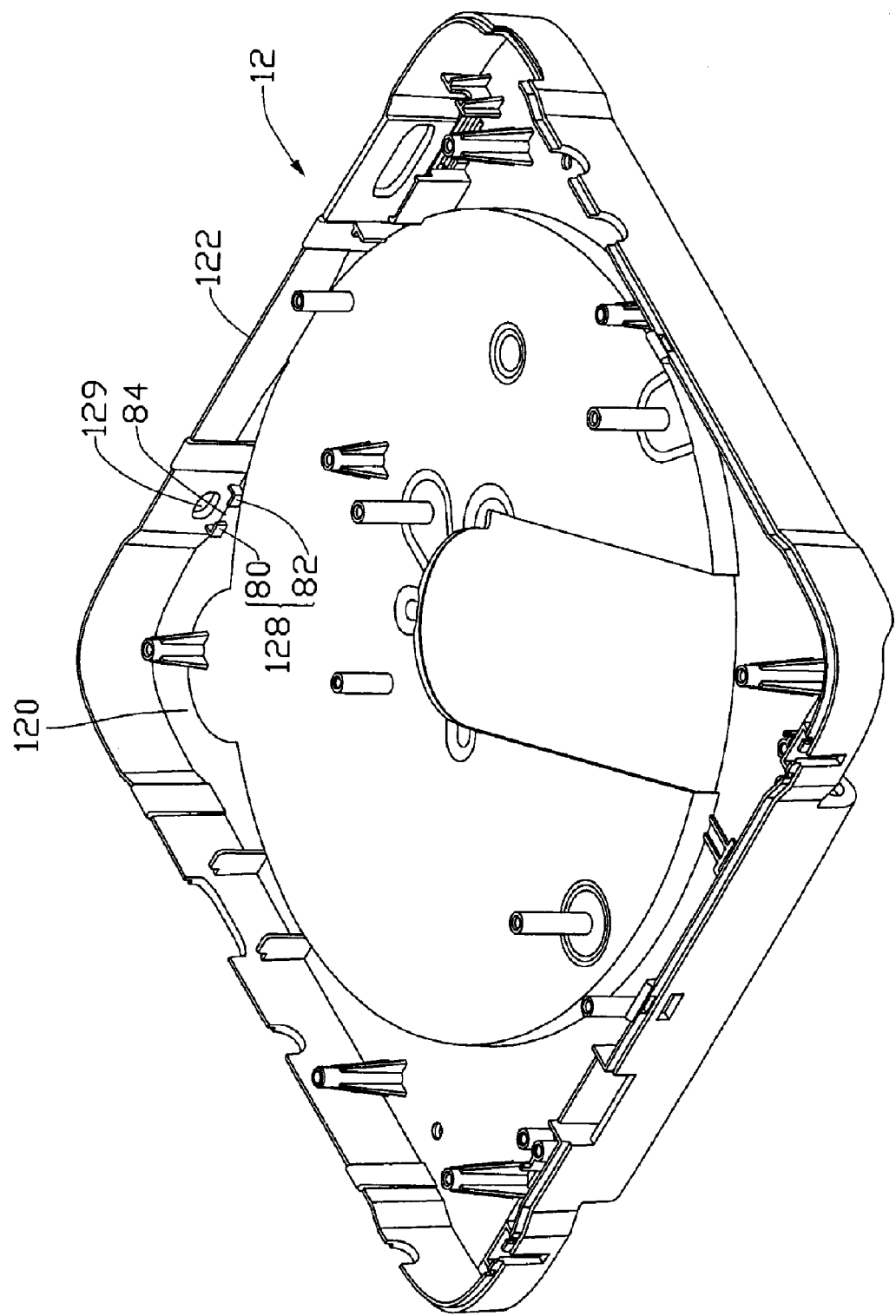
FIG. 2 is an inverted, isometric view of an upper body of the storage medium player of FIG. 1.

The base 10 includes an upper body 12 and a lower body 14 detachably connected with the upper body 12. The upper body 12 includes a substantially plane-shaped top plate 120 and a first sidewall 122 extending perpendicularly from a periphery of the top plate 120. The top plate 120 defines a round recessed medium-receiving portion 123 in a center thereof for receiving a medium (not shown). The medium-receiving portion 123 defines a center hole (not labeled) and an opening 124 extending in a radial direction of the medium-receiving portion from the center hole to an edge of the medium-receiving portion 123. Through the opening 124, the traverse module 20 can raise up to carry the medium (not shown). The first sidewall 122 defines a hole 129 near a corner of the upper body 12. Referring also to FIG. 2, the top plate 120 includes a first engaging portion 128 near a corner thereof. The first engaging portion 128 includes a pair of first and second L-shaped blocks 80 and 82 symmetrically formed on the top plate adjacent to the hole 129. The first and second blocks 80 and 82 cooperate with the first sidewall 122 to define a first accommodating area 84.

Referring to FIG. 1 again, the lower body 14 includes a substantially plane-shaped bottom plate 140 and second sidewall 142 extending perpendicularly from a periphery of the top surface 120. The lower body 14 includes a second engaging portion 144 corresponding to the first engaging portion 128 of the upper body 12. The second engaging portion 144 includes a first blocking plate 40 and a pair of second blocking plates 42 extending upwardly from the bottom plate 140. The first blocking plate 40 is parallel with the second sidewall 142. The second blocking plates 42 are located at two opposite edges of the first blocking plate 40 and perpendicularly interconnect the first blocking plate 40 and the second sidewall 142. The first and second blocking plates 40 and 42 cooperate with the second sidewall 142 to define a second accommodating area 44.

Figure 3:
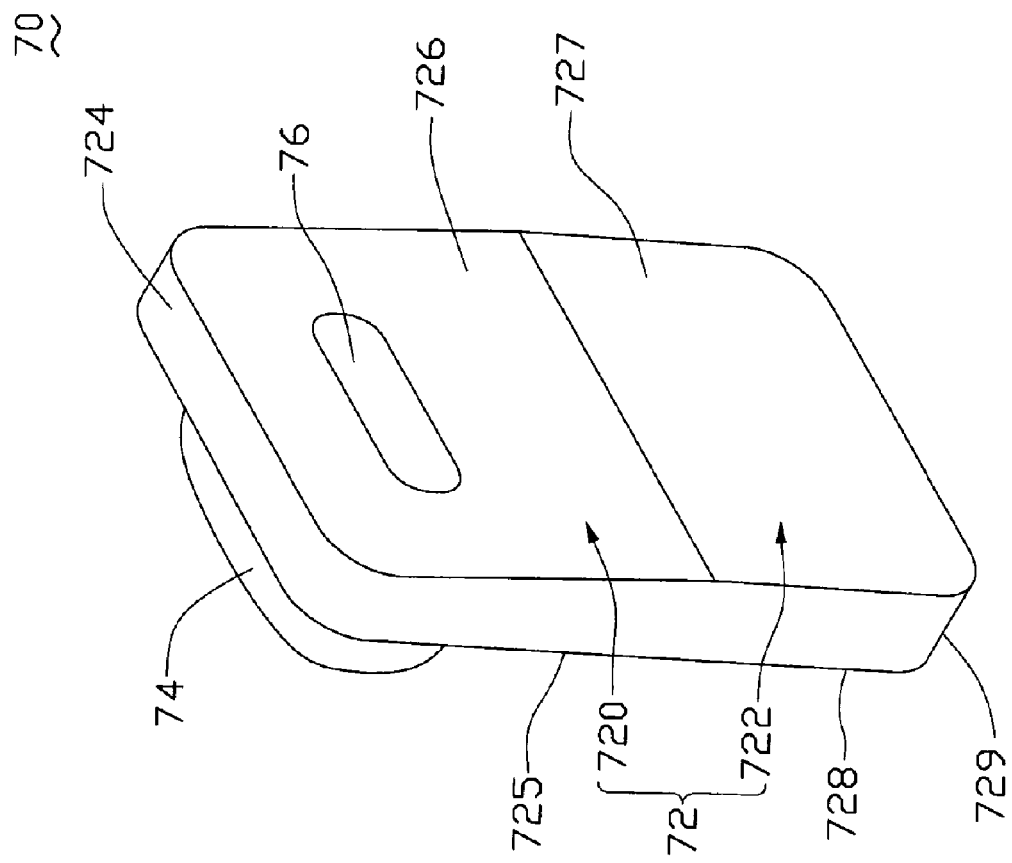
FIG. 3 is an isometric view of a shield of the storage medium player of FIG. 1.

The indicator device 50 includes an indicating lamp 60 and a shield 70. The indicating lamp 60 is mounted on the PCB 30 and electrically connected to the PCB 30. The indicating lamp 60 can be a light emitting diode (LED) that is capable of emitting light in various colors when being supplied with different operating voltages. Referring also to FIG. 3, the shield 70 is integrally molded. The shield 70 includes a main body 72 and a protruding portion 74 extending perpendicularly away from the main body 72. The main body 72 includes an upper portion 720 and a lower portion 722. The upper portion 720 is substantially wedge-shaped, and includes a top surface 724, a first side surface 725 and a second side surface 726 respectively extending downwardly from two opposite edges of the top surface 724. The first and second side surfaces 725 and 726 are inclined at an obtuse angle relative to the top surface 724. The lower portion 722 includes a bottom surface 729, a third side surface 727 and a forth side surface 728 respectively extending upwardly from two opposite edges of the bottom surface 729. The bottom surface 729 is opposite to and parallel with the top surface 720. The third side surface 727 is perpendicular to the bottom surface 729. The forth side surface 728 is adjacent the first side surface 725 to form a continuous plane. In an alternative embodiment, the forth side surface 728 is parallel with the third side surface 727 and generally perpendicular to the bottom surface 729. A width of the top surface 724 is substantially equal to that of the first engaging portion 128. A width of the bottom surface 729 is equal to or slightly greater than that of the second engaging portion 144.

The main body 72 defines a through hole 76 at the second side surface 726. The protruding portion 74 extends from the first side surface 725. The protruding portion 74 defines a void communicating with the through hole 76, so that light is capable of emitting through the through hole 76 to the inside of the protruding portion 74. The protruding portion 74 is transparent or translucent so that light inside the protruding portion 74 can be seen from outside the storage medium player 99. The dimensions of the protruding portion 74 are substantially equal to those of the hole 129 of the upper body 12.

Figure 4:
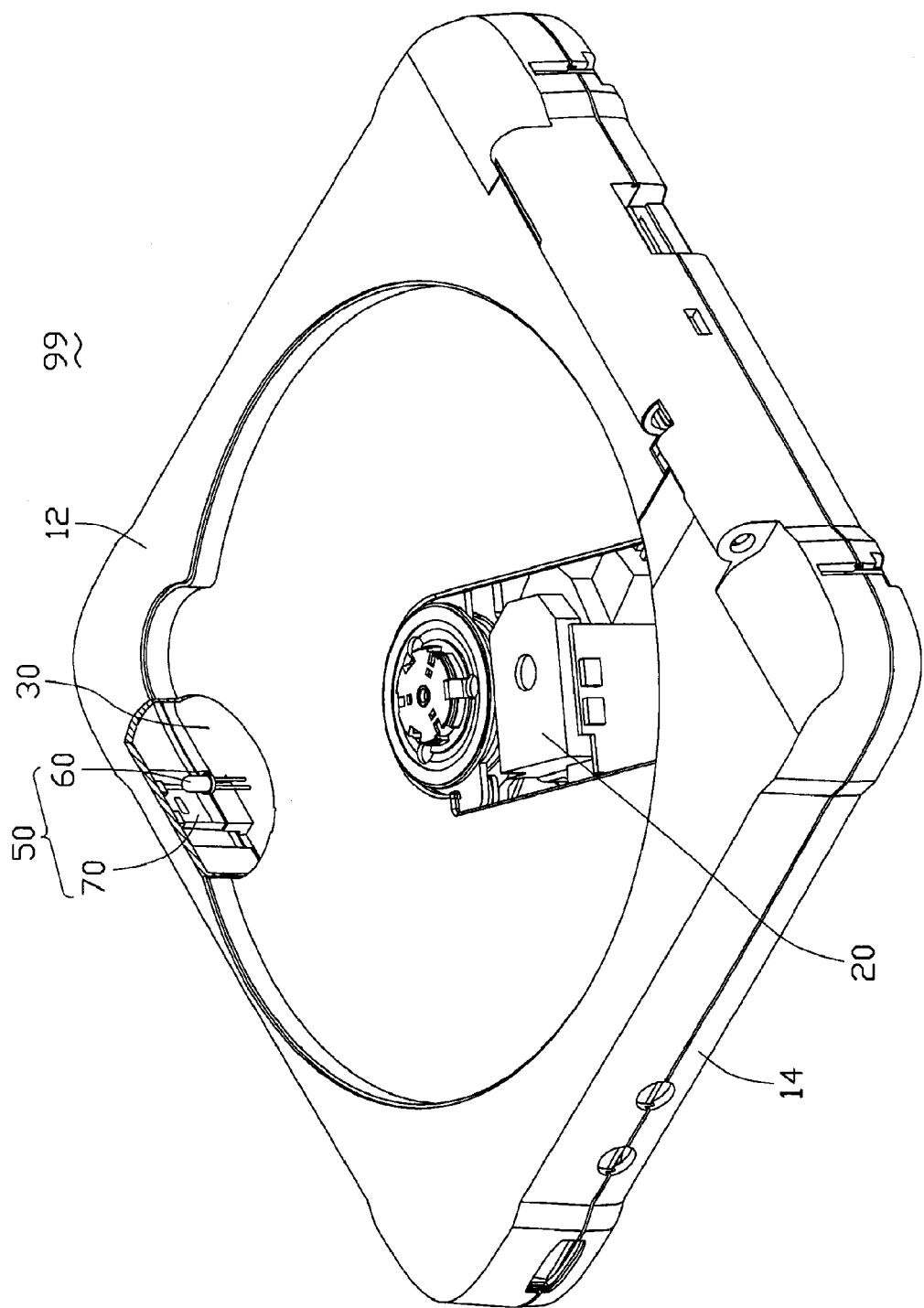
FIG. 4 is a cutaway, assembled view of the storage medium player of FIG. 1.

Referring also to FIG. 4, in assembly, the upper portion 720 of the shield 70 is firstly inserted into the first accommodating area 84 with the protruding portion 74 of the shield 70 being received in the hole 129. Secondly, the traverse module 20 and the PCB 30 are mounted on the bottom plate 140 of the lower body 14, with the indicating lamp 60 mounted on the PCB 30 adjacent to the second engaging portion 144. Finally, the upper body 12 is secured to the lower body 14, with the lower portion 722 of the shield 70 being inserted into the second accommodating area 44. The through hole 76 of the shield 70 is aligned with the indicating lamp 60, light emitted by the indicating lamp 60 transmits through the through hole 76 to the inside of the protruding portion 74 of the shield 70. The protruding portion 74 is transparent or translucent; the light can be seen from the outside of the storage medium player 99.

Whereas the first and second side surfaces 725 and 726 are inclined relative to the upper portion 720, the upper portion 720 of the shield 70 is capable of being inserted easily into the first accommodating area 84. The width of the bottom surface 729 is equal to or slightly greater than that of the second accommodating area 44, slightly deforming the first and second blocking plates 40 and 42 when the lower portion 722 is inserted into the second accommodating area 44. The lower portion 722 is thus firmly engaged with the lower body 14. The width of the top surface 724 is substantially equal to that of the first accommodating area 84, and the first and second side surfaces 725 and 726 are inclined at an obtuse angle relative to the top surface 724, the first and second blocks 80 and 82 are firmly engaged with the upper portion 720 when the upper portion 720 is inserted into the first accommodating area 84. On the other hand, the dimensions of the shield 70 are substantially equal to that of the hole 129, the protruding portion 74 is snugly received in the hole 129. The upper portion 720 of the shield 70 is thus firmly engaged with the upper body 12. Therefore, the shield 70 is firmly fixed inside the base 10.

It should be noted that in other embodiments the first and second blocks 80 and 82 can be interchanged with the first and second blocking plates 40 and 42. Alternatively, the first and second blocks 80 and 82, and the first and second blocking plates 40 and 42 can be replaced with U-shaped stop blocks. The hole 129 can be arranged at the lower body 14, and the upper end of the shield 70 is inserted into the second accommodating area 44 of the lower body 14 so that the protruding portion 74 of the shield 70 is received in the hole 129.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A storage medium player, comprising:
   a base, including an upper body and a lower body, one of the upper body and the lower body including a first engaging portion and defining a hole;
   a printed circuit board mounted in the base; and
   an indicator device including an indicating lamp and a shield, the indicating lamp being mounted on the printed circuit board and being electrically connected to the printed circuit board so as to be supplied with an operating voltage by the printed circuit board, the shield being mounted in the base with one end thereof being engaged with the first engaging portion, and the shield being arranged between the indicating lamp and the hole, the shield including a main body and a protruding portion extending away from the main body, at least a part of the protruding portion being received in the hole.

2. The storage medium player as claimed in claim 1, wherein the one of the upper body and the lower body comprising a sidewall, the first engaging portion cooperating with the sidewall to define an accommodating area so as to receive the end of the shield, and dimensions of the accommodating area are substantially equal to those of the end of the shield.

3. The storage medium player as claimed in claim 1, wherein the one of the upper body and the lower body comprising a substantially plane-shaped plate, the first engaging portion comprising a pair of L-shaped blocks extending out from the plate.

4. The storage medium player as claimed in claim 3, wherein the one of the upper body and the lower body comprising a sidewall extending perpendicularly from the plate, the sidewall cooperating with the pair of L-shaped blocks to define an accommodating area so as to receive the end of the shield, dimensions of the accommodating area are substantially equal to those of the end of the shield.

5. The storage medium player as claimed in claim 4, wherein the end of the shield comprises a first surface, and two inclined second surfaces extending from two side edges of the first surface, the protruding portion of the shield is arranged at one of the inclined second surfaces.

6. The storage medium player as claimed in claim 1, wherein the printed circuit board and the indicating lamp and the shield of the indicator device are positioned in the base, and the hole defined in one of the upper body and the lower body is a through hole.

7. The storage medium player as claimed in claim 1, wherein the other one of the upper body and the lower body comprises a substantially plane-shaped plate, a second engaging portion extending out from the plate for engaging the other end of the shield, the other one of the upper body and the lower body comprises a sidewall extending perpendicularly from the plate, the second engaging portion cooperating with the sidewall to define an accommodating area so as to receive the other end of the shield, dimensions of the accommodating area are substantially equal to those of the other end of the shield.

8. The storage medium player as claimed in claim 7, wherein the second engaging portion comprises a first plate parallel to the sidewall, and a pair of second plates perpendicularly connecting the first plate with the sidewall.

9. A storage medium player, comprising:
a base, including an upper body and a lower body, the upper body including a first engaging portion, the lower body including a second engaging portion, one of the upper body and the lower body defining a hole;
a printed circuit board mounted in the base; and
an indicator device including an indicating lamp and a shield, the indicating lamp being electrically connected to the printed circuit board so as to be supplied with an operating voltage by the printed circuit board, opposite ends of the shield are engaged respectively with the first engaging portion and the second engaging portion, the shield being arranged between the indicating lamp and the hole.

10. The storage medium player as claimed in claim 9, wherein the upper body includes a top plate and a first sidewall extending perpendicularly from the top plate, the first engaging portion cooperates with the first sidewall to form a first accommodating area for receiving one of the two opposite ends of the shield, dimensions of the first accommodating area are substantially equal to those of the one of the two opposite ends of the shield.

11. The storage medium player as claimed in claim 10, wherein the first engaging portion comprises two L-shaped blocks symmetrically formed on the top plate.

12. The storage medium player as claimed in claim 10, wherein the lower body includes a bottom plate and a second sidewall extending perpendicularly from the bottom plate, the second engaging portion cooperates with the second sidewall to form a second accommodating area for receiving the other one of the two opposite ends of the shield, dimensions of the second accommodating area are substantially equal to that of the one of the two opposite ends of the shield.

13. The storage medium player as claimed in claim 12, wherein the second engaging portion includes a first blocking plate extending perpendicularly from the bottom plate, and a pair of second blocking plates connecting two opposite ends of the first blocking plate with the second sidewall.

14. The storage medium player as claimed in claim 9, wherein one end of the shield includes a first surface, and two inclined surfaces extending from two side edges of the first surface, a through hole being defined at one inclined surface, a protruding portion extends from the other one inclined surface, the protruding portion communicating with the through hole.

15. The storage medium player as claimed in claim 14, the other end of the shield includes a second surface parallel to the first surface, and two side surfaces extending perpendicularly from two side edges of the second surface.

16. The storage medium player comprising:
a base comprising a top plate, a bottom plate, and a sidewall between the top and bottom plates, the sidewall defining a through hole therein;
an indicating lamp located within the base for indicating working states of the storage medium player;
a shield comprising a main body, and a protrusion extending from the main body, the main body including an upper portion engaged with the top plate, and
a lower portion engaged with the bottom plate, the protrusion extending into the through hole of the sidewall and being one of transparent and translucent so that light of the indicating lamp is visible from outside of base via the through hole of the sidewall and the protrusion.

17. The storage medium player of claim 16, wherein the top plate includes a first engaging portion defining a first accommodating area, the bottom plate includes a second engaging portion defining a second accommodating area, and the upper and lower portions are received in the first and second accommodating areas, respectively.

18. The storage medium player of claim 16, wherein one of the top and bottom plates includes an engaging portion defining an accommodating area, a corresponding one of the upper and lower portions is received in the accommodating area, and the corresponding one of the upper and lower portions is wedge-shaped.

19. The storage medium player as claimed in claim 14, wherein the protruding portion defines a void communicating with the hole and is snugly received in the hole.

20. The storage medium player of claim 16, wherein the protrusion defines a void communicating with the hole.

* * * * *